US012770541B2

(12) United States Patent
Oh et al.

(10) Patent No.: US 12,770,541 B2
(45) Date of Patent: Oct. 20, 2026

(54) ORGANIC LIGHT EMITTING DISPLAY DEVICE

(71) Applicant: LG Display Co., Ltd., Seoul (KR)

(72) Inventors: ChangSeok Oh, Daegu (KR); Juhyun Yoon, Gimpo-si (KR); Yunjong Choi, Yangsan-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/320,875

(22) Filed: Sep. 5, 2025

(65) Prior Publication Data

US 2026/0004690 A1 Jan. 1, 2026

Related U.S. Application Data

(63) Continuation of application No. 18/236,803, filed on Aug. 22, 2023, now Pat. No. 12,412,497, which is a (Continued)

(30) Foreign Application Priority Data

Dec. 31, 2020 (KR) ........................ 10-2020-0189702

(51) Int. Cl.

*G09G 3/00* (2006.01)
*G06F 3/041* (2006.01)
*G09G 3/3208* (2016.01)

(52) U.S. Cl.

CPC ........... *G09G 3/035* (2020.08); *G06F 3/0418* (2013.01); *G09G 3/3208* (2013.01); (Continued)

(58) Field of Classification Search

CPC .... G06F 1/1616; G06F 1/1643; G06F 1/1637; G06F 1/1652; G06F 3/0412; G06F 1/16; (Continued)

(56) References Cited

U.S. PATENT DOCUMENTS 11,024,653 B2 6/2021 Kim
11,769,432 B2 9/2023 Oh et al.
(Continued)

FOREIGN PATENT DOCUMENTS

CN 110928438 A 3/2020
CN 111913604 A 11/2020
(Continued)

*Primary Examiner* — Sujit Shah
(74) *Attorney, Agent, or Firm* — Birch, Stewart, Kolasch & Birch, LLP

(57) ABSTRACT

An organic light emitting display device can include an organic light emitting display panel, a touch panel, a support member below the organic light emitting display panel, a first flexible circuit film on one side of the organic light emitting display panel to bend toward a bottom of the support member, a second flexible circuit film on one side of the touch panel to bend toward the bottom surface of the support member, a low potential voltage line on the organic light emitting display panel, a first printed circuit board to supply a low potential voltage to the low potential voltage line, and a second printed circuit board supplied with a touch signal to the touch panel. The first and the second flexible circuit films are grounded to the support member.

20 Claims, 13 Drawing Sheets

Related U.S. Application Data continuation of application No. 17/501,761, filed on Oct. 14, 2021, now Pat. No. 11,769,432.

(52) U.S. Cl.
CPC .............. *G06F 2203/04102* (2013.01); *G09G 2300/0842* (2013.01); *G09G 2310/08* (2013.01)

(58) Field of Classification Search
CPC ................. G09G 2354/00; G09G 1/00; G09G 2300/023; G09G 5/00; G09G 2330/021; G09G 5/12; G09G 3/32; G09G 3/3208; G09G 2300/0426
See application file for complete search history.

(56) References Cited

U.S. PATENT DOCUMENTS

| | | | | |
|---|---|---|---|---|
| 2009/0310057 | A1 | 12/2009 | Kang et al. | |
| 2010/0156857 | A1 | 6/2010 | Nozaki | |
| 2014/0085281 | A1 | 3/2014 | Lim | |
| 2014/0111116 | A1* | 4/2014 | Shin | H05B 45/60 315/312 |
| 2016/0118454 | A1 | 4/2016 | Park et al. | |
| 2016/0205391 | A1 | 7/2016 | Kim | |
| 2018/0145278 | A1 | 5/2018 | Zhai | |
| 2019/0278411 | A1 | 9/2019 | Jeon et al. | |
| 2020/0098793 | A1 | 3/2020 | Kim | |
| 2020/0100362 | A1 | 3/2020 | Yamaguchi | |
| 2020/0212135 | A1 | 7/2020 | Zhang | |
| 2020/0267838 | A1* | 8/2020 | An | G06F 1/1616 |
| 2021/0259097 | A1* | 8/2021 | Lee | H05K 1/0259 |
| 2021/0303121 | A1* | 9/2021 | Ku | G06F 3/04164 |

FOREIGN PATENT DOCUMENTS

| | | | |
|---|---|---|---|
| KR | 10-2014-0012487 | A | 2/2014 |
| KR | 10-2014-0042657 | A | 4/2014 |
| KR | 10-2016-0050149 | A | 5/2016 |
| KR | 10-2020-0034052 | A | 3/2020 |
| KR | 10-2020-0078887 | A | 7/2020 |
| KR | 10-2020-0101116 | A | 8/2020 |

* cited by examiner

ORGANIC LIGHT EMITTING DISPLAY DEVICE

CROSS-REFERENCE TO RELATED APPLICATIONS

This application is a Continuation application of U.S. application Ser. No. 18/236,803 filed on Aug. 22, 2023, which is a Continuation application of U.S. application Ser. No. 17/501,761 filed on Oct. 14, 2021 (now U.S. Pat. No. 11,769,432 issued on Sep. 26, 2023), which claims priority to Korean Patent Application No. 10-2020-0189702 filed on Dec. 31, 2020 in the Korean Intellectual Property Office, the entire contents of all these applications being hereby expressly incorporated by reference into the present application.

BACKGROUND

Field

The present disclosure relates to an organic light emitting display device to which a ground voltage is stably applied.

Description of the Related Art

Unlike a liquid crystal display (LCD) device which includes a backlight, an organic light emitting display (OLED) device does not use a separate light source. Therefore, the organic light emitting display device can be manufactured to be light and thin, has process advantages and has a low power consumption due to the low voltage driving.

The organic light emitting display device includes a self-emitting element and layers formed of organic thin films so that the flexibility and elasticity are superior to the other display devices. Thus, it is advantageous to be implemented as a flexible display device.

Recently, In an information era, a display field which visually expresses electrical information signals has been rapidly developed and in response to this, various display devices having excellent performances such as thin-thickness, light weight, and low power consumption have been developed. The plastic organic light emitting display device uses a plastic film as a base material instead of a thick glass so that it is light-weight and has an excellent flexibility to be applied to various shapes such as a flexible display device.

Specifically, a flexible display device which is manufactured to be capable of displaying images even though the flexible display device is bent or folded like papers is attracting attention as the next generation display device. The flexible display device utilizes a plastic thin film transistor substrate rather than glass to be classified into an unbreakable display device having a high durability, a bendable display device which is bent without being broken, a rollable display device which is rolled, and a foldable display device which is folded. Such a flexible display device has advantages in terms of space utilization, interior, and designs and has various application fields.

Further, in recent years, products which include a built-in touch sensor to have a touch screen function which is operated by touching a screen, such as a mobile device, a PDA (personal digital assistant), and a computer notebook which are personal portable devices, have become indispensable. For example, the organic light emitting display device can further include a touch panel. There are an add-on type organic light emitting display device in which a touch panel is attached on an outer surface, an on-cell type organic light emitting display device in which a touch panel is deposited thereon, and an in-cell type organic light emitting display device with a built-in touch panel. According to the in-cell type with a built-in touch panel, the touch panel is embedded in the organic light emitting display device so that it is implemented with a thin thickness as compared with the add-on type and the on-cell type.

In the meantime, a flexible display device, such as a foldable display device, is implemented with a thin thickness so that there can be a limitation in that a touch noise may be caused on the touch panel on the display panel due to a voltage fluctuation of a thin film transistor TFT during the driving of the display panel.

As the display device becomes larger in size, the low potential voltage (VSS) rises in a pixel located far from the driving circuit, and accordingly, the driving voltage and power consumption increase, and the luminance of the display device can become non-uniform. Further, due to the rise of the low potential voltage, a voltage difference can be caused between the low potential voltage applied to the display panel and the touch panel, which can cause a touch noise in the touch panel.

SUMMARY OF THE DISCLOSURE

An object to be achieved by the present disclosure is to stably supply a low potential voltage to an organic light emitting display device.

Another object to be achieved by the present disclosure is to provide an organic light emitting display device which supplies a constant ground voltage to a display panel to suppress influence of an electric field generated by a thin film transistor of the display panel on a touch panel disposed thereabove.

Still another object to be achieved by the present disclosure is to reduce a voltage difference between a display panel and a touch panel to reduce a touch noise.

Still another object to be achieved by the present disclosure is to provide a foldable display device with an improved touch performance.

Objects of the present disclosure are not limited to the above-mentioned objects, and other objects, which are not mentioned above, can be clearly understood by those skilled in the art from the following descriptions.

According to an aspect of the present disclosure, an organic light emitting display device includes an organic light emitting display panel including a plurality of sub pixels; a touch panel on the organic light emitting display panel; a support member which is disposed below the organic light emitting display panel and is formed of a metal material; a first flexible circuit film which is disposed on one side of the organic light emitting display panel and is bent toward a bottom surface of the support member; a second flexible circuit film which is disposed on one side of the touch panel and is bent toward the bottom surface of the support member; and a third flexible circuit film which is disposed on one side of the organic light emitting display panel and is bent toward the bottom surface of the support member to stabilize a low potential voltage. The first flexible circuit film, the second flexible circuit film, and the third flexible circuit film are grounded to the support member.

Other detailed matters of the exemplary embodiments are included in the detailed description and the drawings.

According to the present disclosure, a flexible circuit film including a conductive sheet is additionally disposed to stabilize a low potential voltage which is supplied to a cathode of the display panel to suppress the rising of the low potential voltage.

According to the present disclosure, an organic light emitting display device which implements a ground structure which is electrically connected to a display panel and a ground using a support member formed of a metal material such as stainless steel (SUS) can be provided.

According to the present disclosure, a voltage fluctuation and an electric field generated from the display panel are suppressed using a ground structure of the support member to reduce a noise of the touch panel.

According to the present disclosure, a foldable display device which reduces a voltage difference between a display panel and a touch panel to reduce a touch noise and improve a touch performance can be provided.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
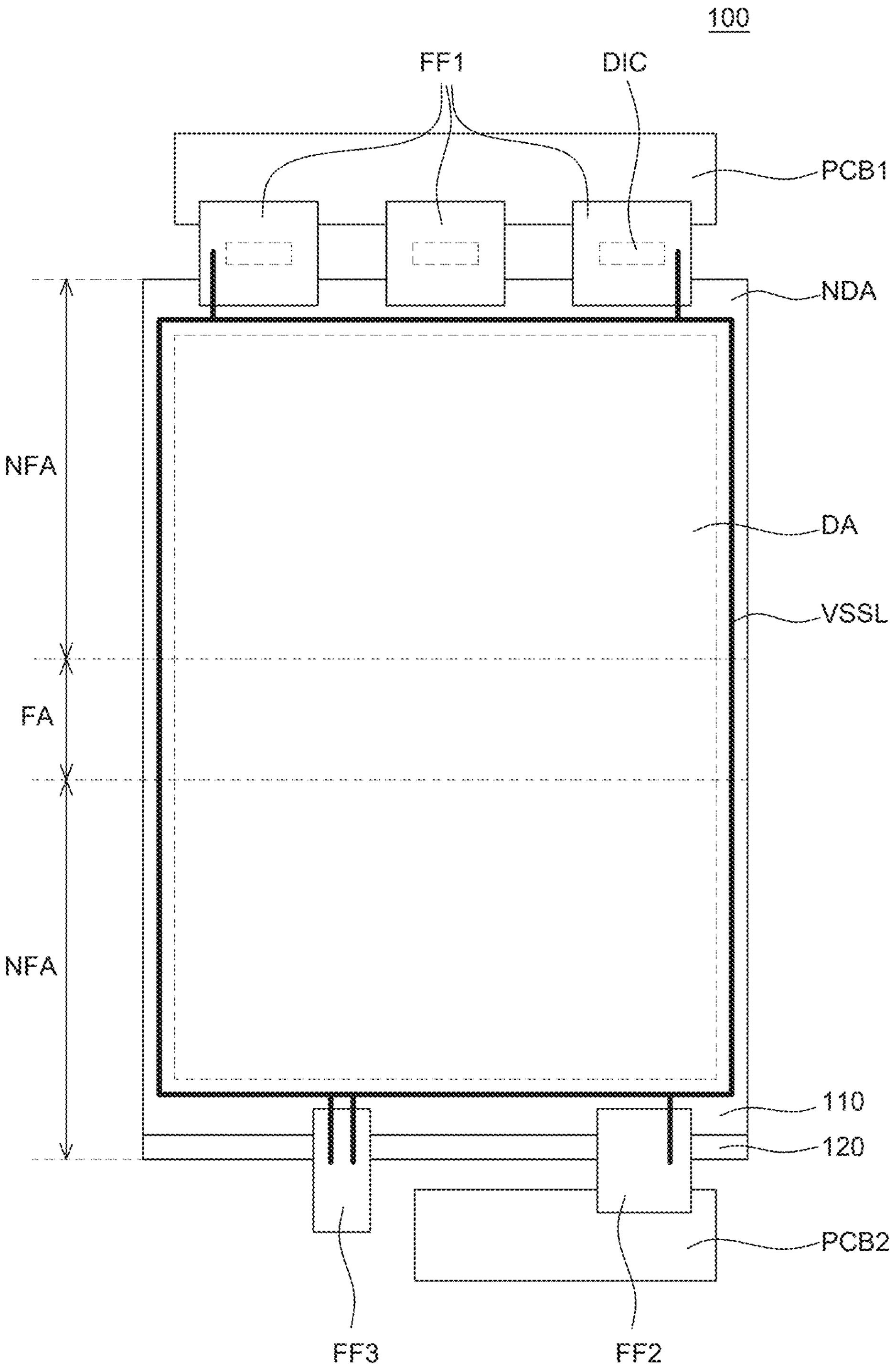
FIG. 1 is a plan view of an organic light emitting display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components and may not define order. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, an organic light emitting display device according to exemplary embodiments of the present disclosure will be described in detail with reference to accompanying drawings. All the components of each organic light emitting display device according to all embodiments of the present disclosure are operatively coupled and configured.

Figure 2:
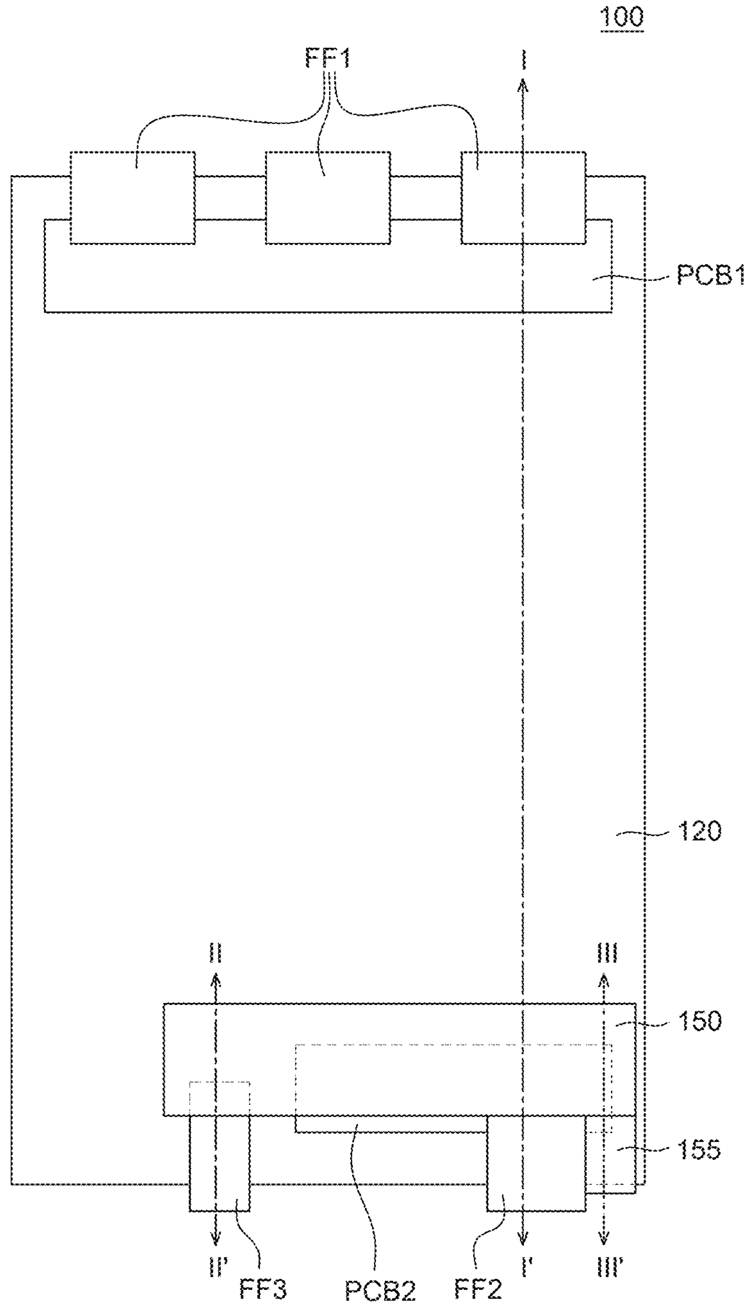
FIG. 2 is a rear view of an organic light emitting display device according to an exemplary embodiment of the present disclosure.

FIGS. 1 to 3C are views for explaining an organic light emitting display device according to an exemplary embodiment of the present disclosure. FIG. 1 is a plan view of an organic light emitting display device according to an exemplary embodiment of the present disclosure. FIG. 2 is a rear view of an organic light emitting display device according to an exemplary embodiment of the present disclosure. FIG. 3A is a cross-sectional view taken along the line I-I' of FIG.

2. FIG. 3B is a cross-sectional view taken along the line II-II' of FIG. 2. FIG. 3C is a cross-sectional view taken along the line III-III' of FIG. 2.

An organic light emitting display device 100 according to an exemplary embodiment of the present disclosure includes a display panel 110, a touch panel 130, a support member 120, a first flexible circuit film FF1, a second flexible circuit film FF2, a third flexible circuit film FF3, a first printed circuit board PCB1, and a second printed circuit board PCB2.

Referring to FIG. 1, the organic light emitting display device 100 according to the exemplary embodiment of the present disclosure includes a display area DA and a non-display area NDA. The display area DA is an area where a plurality of pixels is disposed to substantially display images.

In the display area DA, a plurality of pixels which includes an emission area to display images, a thin film transistor for driving the pixels, a capacitor, and the like can be disposed. One pixel can include a plurality of sub pixels SP. The sub pixel SP is a minimum unit which configures the display area and each sub pixel SP can be configured to emit light of a specific wavelength band. For example, each of the sub pixels SP can be configured to emit red light, green light, blue light, or white light. The non-display area NDA is disposed so as to enclose the display area DA. The non-display area NDA is an area where images are not substantially displayed and various wiring lines, driving ICs, and the like for driving the pixels and the driving elements disposed in the display area DA are disposed therein. For example, in the non-display area NDA, various driving ICs such as a gate driver IC and a data driver IC, VSS lines, and the like can be disposed.

Referring to FIG. 1, the organic light emitting display device 100 according to the exemplary embodiment of the present disclosure can be a foldable display device which is folded in one direction. In this case, the organic light emitting display device 100 includes a folding area FA and a non-folding area NFA. The folding area FA is an area which is folded when the organic light emitting display device 100 is folded and is folded along a specific radius of curvature with respect to a folding axis.

When the organic light emitting display device 100 is folded, if the folding area FA is folded with respect to the folding axis, the folding area FA can form a part of a circle or an oval. At this time, a radius of curvature of the folding area FA can refer to a radius of a circle or an oval formed by the folding area FA. When a top surface of the organic light emitting display device 100 on which images are displayed is defined as a display surface and a bottom surface of the organic light emitting display device 100 which is an opposite surface of the display surface is defined as a rear surface, the folding area FA can be folded by a method selected from an out-folding method and an in-folding method. According to the out-folding method, the folding area is folded to expose the display surface of the organic light emitting display device 100 to the outside and according to the in-folding method, the folding area is folded such that display surfaces of the organic light emitting display device 100 face each other.

The non-folding area NFA is an area which is not folded when the organic light emitting display device 100 is folded. For example, the non-folding area NFA maintains a flat state when the organic light emitting display device 100 is folded. The non-folding area NFA can be located on both sides of the folding area FA. For example, the non-folding area NFA can be an area extending to an X-axis direction with respect to the folding axis. At this time, the folding area FA can be defined between the non-folding areas NFA. Further, when the organic light emitting display device 100 is folded with respect to the folding axis, the non-folding areas NFA can overlap each other.

In FIG. 1, one folding area FA and two non-folding areas NFA are disposed. However, the number and the position of folding areas FA and non-folding areas NFA can vary in various forms, but it is not limited thereto.

The display panel 110 is a panel in which images are implemented. Display elements for implementing images, circuit units for driving the display elements, and the like can be disposed in the display panel. The circuit units can include various thin film transistors, capacitors, wiring lines, driving ICs, and the like for driving the organic light emitting diode. For example, the circuit units can include various configurations such as a driving thin film transistor, a switching thin film transistor, a storage capacitor, a gate line, a data line, a gate driver IC, and a data driver IC, but are not limited thereto.

Specifically, the display panel 110 includes a flexible substrate, a thin film transistor, and an organic light emitting diode.

The flexible substrate can be a very thin plastic substrate to implement a flexibility of the organic light emitting display device 100. The flexible substrate can be formed of an insulating material having a flexibility, and for example, the flexible substrate can be an insulating plastic substrate selected from polyimide, polyethersulfone, polyethylene terephthalate, and polycarbonate. However, it is not limited thereto and if a material is not broken even when the foldable display device 100 is repeatedly folded, not only the plastic, but also the other material having a flexibility can be used. The plastic substrate has a relatively weak barrier characteristic against moisture or oxygen so that in order to compensate therefor, the plastic substrate can have a structure in which a plastic film and an inorganic layer are laminated. For example, the flexible substrate can have a multi-layered structure in which a first plastic film, an inorganic layer, and a second plastic film are sequentially laminated, but is not limited thereto.

A thin film transistor is disposed on the flexible substrate to drive the organic light emitting diode. The thin film transistor can be disposed in each of the plurality of pixel areas. For example, the driving thin film transistor includes a gate electrode, an active layer, a source electrode, and a drain electrode. Further, the thin film transistor can further include a gate insulating layer which insulates the gate electrode and the active layer and an interlayer insulating layer which insulates the gate electrode from the source and drain electrodes.

A planarization layer can be disposed on the thin film transistor to planarize an upper surface.

The organic light emitting diode is disposed on the planarization layer. The organic light emitting diode can include an anode, a cathode, and an organic light emitting layer disposed therebetween. In the organic light emitting diode, holes injected from the anode and electrons injected from the cathode are coupled on the organic light emitting layer to emit light. Images are displayed using the light emitted as described above.

A low potential voltage line VSSL is disposed on the flexible substrate of the display panel 110 to correspond to the non-display area NDA. The low potential voltage line VSSL is disposed to enclose the display area DA along an outer periphery of the display panel 110. The low potential voltage line VSSL can have a closed rectangular ring shape.

The low potential voltage line VSSL is formed of a metal material having a high conductivity. The low potential voltage line VSSL is in contact with the cathode of the organic light emitting diode of the display panel 110 to apply a low potential voltage to the cathode. Referring to FIG. 1, the low potential voltage line VSSL is connected to the first flexible circuit film FF1 and the third flexible circuit film FF3. The low potential voltage line VSSL can be supplied with low potential voltages from the first flexible circuit film FF1 and the third flexible circuit film FF3, respectively. The connection of the low potential voltage line VSSL and the flexible circuit films will be described below.

The support member 120 is disposed below the display panel 110. The flexible substrate has an excellent flexibility, but is relatively thin and has a weak rigidity as compared with a glass substrate. Therefore, when the flexible substrate is folded, it can be difficult to consistently maintain the shape and when various elements are disposed thereon, the flexible substrate can be sagged. In order to solve this problem, the support member 120 is disposed below the display panel 110.

The support member 120 includes a back plate. For example, the back plate can be a metal material such as stainless steel (SUS) or Invar and can be formed of a plastic material such as polymethylmethacrylate (PMMA), polycarbonate (PC), polyvinylalcohol (PVA), acrylonitrile butadiene-styrene (ABS), polyethylene terephthalate (PET), silicone, or polyurethane (PU).

The support member 120 can further include a plate assembly. The plate assembly is disposed below the back plate. The plate assembly is disposed below the back plate to more firmly support the display panel 110.

The plate assembly includes a plate top and a plate bottom. The plate top and the plate bottom can be integrally formed and if necessary, the plate top or the plate bottom can be omitted.

The plate bottom can include an opening pattern in a part corresponding to the folding area of the flexible display device 100. Therefore, the rigidity of the display panel 110 is reinforced and the stress during the folding can be effectively relieved. For example, the plate bottom can be formed of a metal material such as stainless steel (SUS) or invar.

The plate top can be disposed between the back plate and the plate bottom. The plate top is formed of a material having a high rigidity to enhance the rigidity of the display panel 110. Further, the plate top can suppress a phenomenon that the opening pattern of the plate bottom is visible through the display panel 110. For example, the plate top can be formed of a metal material such as stainless steel (SUS), invar, aluminum, or magnesium. As another example, the plate top can be formed of a plastic material such as polymethylmethacrylate (PMMA) or polycarbonate (PC).

The touch panel 130 is disposed on the display panel 110. The touch panel 130 means a panel which receives a touch input of a user with respect to the display device. For example, as the touch panel 130, a capacitive type, a resistive film type, an ultrasonic type, or an infrared type can be used, and desirably, a capacitive type touch panel 130 can be used as the touch panel 130. Even though in FIGS. 3A to 3C, it is illustrated that the touch panel 130 is disposed above the display panel 110, the touch panel 130 can also be disposed below the display panel 110. Further, the touch panel 130 can be integrally formed with the display panel 110.

The first flexible circuit film FF1 is disposed at one side of the display panel 110. The first flexible circuit film FF1 transmits various signals from the first printed circuit board PCB1 to the display panel 110. In the first flexible circuit film FF1, a driving circuit (for example, an IC chip) can be mounted. The driving circuit DIC can generate a data signal or a gate signal corresponding to a driving power or various signals which are transmitted from the first printed circuit board PCB1 and supply the data signal or the gate signal to the thin film transistor TFT formed on the display panel 110. To this end, the driving circuit DIC can include both a data driver which generates a data signal and a gate driver which generates a scan signal or the data driver and the gate driver can be separated from each other. In this case, the first flexible circuit film FF1 can transmit the signals output from the first printed circuit board PCB1 to the driving circuit DIC or transmit signals output from the driving circuit DIC to the thin film transistor TFT formed on the display panel 110. Even though in the present disclosure, it has been described that the driving circuit DIC can be disposed on the first flexible circuit film FF1, the driving circuit can be directly disposed on the lower substrate. The first flexible circuit film FF1 can be attached onto a pad unit provided in a non-display area NDA of the display panel 110 using an anisotropic conducting film ACF.

The first printed circuit board PCB1 is attached to the first flexible circuit film FF1. Specifically, the first printed circuit board PCB1 is attached to another side of the first flexible circuit film FF1 with respect to one side of the first flexible circuit film FF1 which is connected to the display panel 110. The first printed circuit board PCB1 transmits various signals to the thin film transistor TFT formed on the display panel 110. For example, a timing controller and the like can be disposed on the first printed circuit board PCB1. The timing controller can supply various signals to the driving circuit. For example, the timing controller generates a data driver control signal DDC and a gate driver control signal GDC to supply the signals to the driving circuit DIC.

The second flexible circuit film FF2 is disposed at the other side of the touch panel 130. At this time, the other side of the touch panel 130 refers to a side portion of the touch panel 130 corresponding to an opposite side portion of one side of the display panel 110 to which the first flexible circuit film FF1 is attached. For example, referring to FIG. 1, the first flexible circuit film FF1 is disposed at an upper side portion of the display panel 110 and the second flexible circuit film FF2 is disposed at a lower side portion of the touch panel 130 opposite thereto. The second flexible circuit film FF2 transmits signals output from the second printed circuit board PCB2 to the touch panel 130. The second flexible circuit film FF2 can be attached onto a pad unit provided in the non-display area NDA of the touch panel 130 using an anisotropic conducting film ACF.

The second printed circuit board PCB2 is attached to the second flexible circuit film FF2. Specifically, the second printed circuit board PCB2 is attached to another side of the second flexible circuit film FF2 with respect to one side of the second flexible circuit film FF2 which is connected to the touch panel 130. The second printed circuit board PCB2 transmits various signals to the touch electrode formed on the touch panel 130. For example, a touch controller and the like can be disposed on the second printed circuit board PCB2. The touch controller can supply the touch signal to the touch electrode of the touch panel 130. For example, the touch controller supplies a touch driving signal to the touch electrode of the touch panel 130 and receives a touch sensing signal from the sensing signal. The touch controller analyzes waveforms and amplitudes of the touch driving signal and the touch sensing signal to detect a position and an intensity of the touch input.

The third flexible circuit film FF3 is disposed at the other side of the display panel 110. At this time, the other side of the touch panel 130 refers to a side portion corresponding to an opposite side portion of one side of the display panel 110 to which the first flexible circuit film FF1 is attached. For example, referring to FIG. 1, the first flexible circuit film FF1 is disposed at an upper side portion of the display panel 110 and the third flexible circuit film FF3 is disposed at a lower side portion of the display panel 110 opposite thereto. The third flexible circuit film FF3 can be attached onto a pad unit provided in a non-display area NDA of the display panel 110 using an anisotropic conducting film ACF.

The third flexible circuit film FF3 is connected to the low potential voltage line VSSL to stabilize a low potential voltage. The third flexible circuit film FF3 is disposed in the other non-display area located at the opposite side of one side at which the first flexible circuit film FF1 which applies the low potential voltage is formed so that an additional low potential voltage can be supplied to the cathode by means of the low potential voltage line VSSL. To this end, the third flexible circuit film FF3 includes a conductive sheet layer formed of a metal material having a low resistance. The third flexible circuit film FF3 is electrically connected to the cathode of the display panel 110 by means of the low potential voltage line VSSL to compensate for a high resistance of the cathode by the conductive sheet layer to suppress the rising of the low potential voltage VSS. Further, the third flexible circuit film FF3 directly supplies the low potential voltage to the cathode to suppress the rising of the low potential voltage of the cathode electrode.

In the meantime, in the organic light emitting display device 100 according to the exemplary embodiment of the present disclosure, the flexible circuit film and the printed circuit board are independently disposed but a separate flexible circuit film and the printed circuit board are not attached to each other. Instead, the flexible circuit film and the printed circuit board are integrally formed so that a flexible printed circuit board FPCB in which the flexible circuit film itself can serve as a printed circuit board can be used.

Hereinafter, a placement structure of components of the organic light emitting display device 100 according to the exemplary embodiment of the present disclosure will be described in more detail with reference to FIGS. 2 to 3C. In FIGS. 2 to 3C, in the organic light emitting display device 100 according to the exemplary embodiment of the present disclosure, a structure in which a first flexible circuit film FF1, a second flexible circuit film FF2, and a third flexible circuit film FF3 are bent in one direction to be disposed on a bottom surface of the support member 120 has been illustrated.

Referring to FIGS. 2 to 3C, the first flexible circuit film FF1, the second flexible circuit film FF2, and the third flexible circuit film FF3 are bent in a lower direction of the display panel 110. At least a part of each of the first flexible circuit film FF1, the second flexible circuit film FF2, and the third flexible circuit film FF3 which are bent is disposed to be opposite to the bottom surface of the support member 120.

At this time, all the first flexible circuit film FF1, the second flexible circuit film FF2, and the third flexible circuit film FF3 are electrically connected to the bottom surface of the support member 120 having a ground voltage.

Figure 3A:
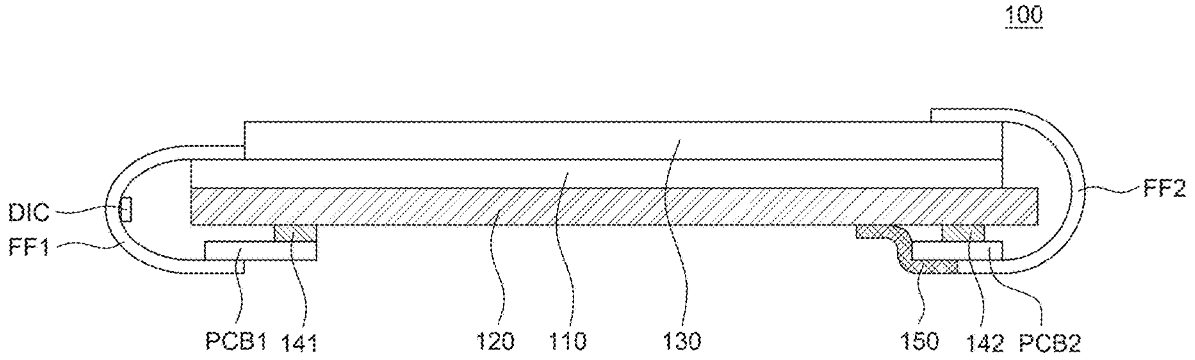
FIG. 3A is a cross-sectional view taken along the line I-I' of FIG. 2.
Figure 3B:
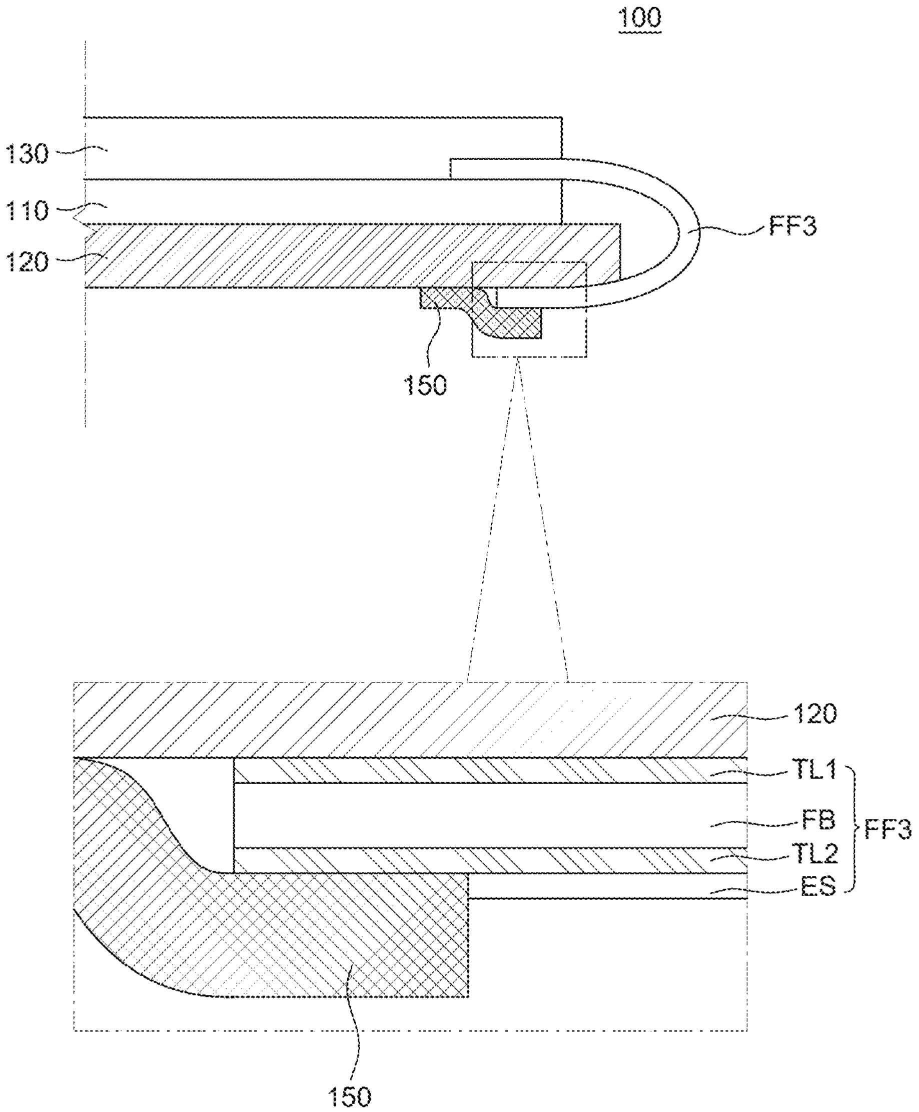
FIG. 3B is a cross-sectional view taken along the line II-II' of FIG. 2.
Figure 3C:
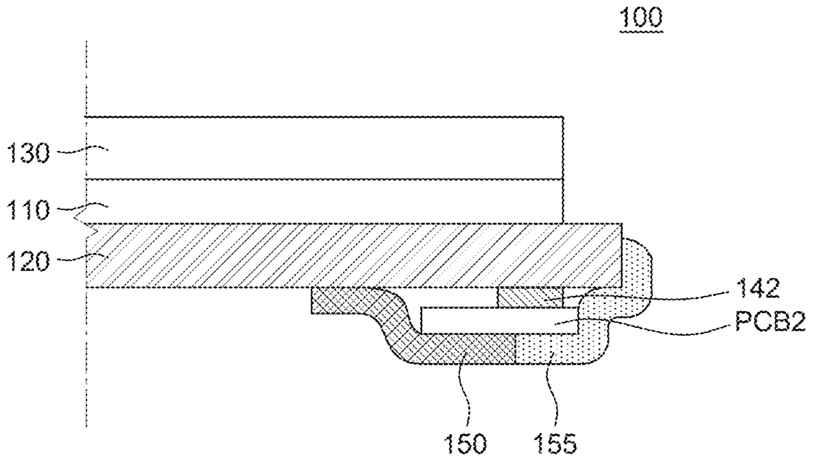
FIG. 3C is a cross-sectional view taken along III-III' of FIG. 2.

First, referring to FIG. 3A, the first printed circuit board PCB1 connected to the first flexible circuit film FF1 is attached onto the bottom surface of the support member 120 by means of a first conductive adhesive member 141. The first conductive adhesive member 141 is a double-sided adhesive tape having a conductivity. By doing this, the first flexible circuit film FF1 can provide a ground line path between the first printed circuit board PCB1 and the display panel 110. Accordingly, the first flexible circuit film FF1 can have a ground structure which is electrically connected to the ground of the support member 120 by means of the first printed circuit board PCB1 and the first conductive adhesive member 141.

Further, the second printed circuit board PCB2 connected to the second flexible circuit film FF2 is attached onto the bottom surface of the support member 120 by means of a second conductive adhesive member 142. The second conductive adhesive member 142 is a double-sided adhesive tape having a conductivity. By doing this, the second flexible circuit film FF2 can provide a ground line path between the second printed circuit board PCB2 and the touch panel 130. Accordingly, the second flexible circuit film FF2 can have a ground structure which is electrically connected to the ground of the support member 120 by means of the second printed circuit board PCB2 and the second conductive adhesive member 142.

Referring to FIG. 3B, the third flexible circuit film FF3 is attached to be in direct contact with the bottom surface of the support member 120 by means of a first conductive fiber tape 150. The third flexible circuit film FF3 includes a flexible base layer FB, thin film lines TL1 and TL2 disposed on both surfaces of the flexible base layer FB, and an insulating layer ES which covers a part of the thin film lines TL1 and TL2. To be more specific, the third flexible circuit film FF3 includes a flexible base layer FB, a first thin film line TL1, a second thin film line TL2, and an insulating layer ES. The first thin film line TL1 is disposed on one surface of the flexible base layer FB which faces the bottom surface of the support member 120 during the bending. The second thin film line TL2 is disposed on the other surface of the flexible base layer FB which is an opposite surface of one surface which faces the bottom surface of the support member 120 during the bending. Further, the insulating layer ES covers at least a part of the first thin film line TL1 and the second thin film line TL2.

At this time, in the third flexible circuit film FF3, the first thin film line TL1 which faces the bottom surface of the support member 120 during the bending is in direct contact with the bottom surface of the support member 120. Further, the first conductive fiber tape 150 is attached onto the second thin film line TL2 after bending the third flexible circuit film FF3 so that the third flexible circuit film FF3 and the support member 120 are in physical contact with each other to be fixed. The first conductive fiber tape 150 has an adhesiveness on one surface so that a bottom surface of the support member 120 and the other surface of the third flexible circuit film FF3 are simultaneously attached.

Further, the first conductive fiber tape 150 can electrically connect the second thin film line TL2 formed on the other surface of the third flexible circuit film FF3 and the bottom surface of the support member 120. By doing this, the third flexible circuit film FF3 can provide a ground line path between the support member 120 and the display panel 110. Accordingly, the third flexible circuit film FF3 has a ground structure which is electrically connected to the ground of the support member 120 by means of a structure in which the support member 120 and the first thin film line TL1 are in direct contact with each other and a structure in which the support member 120 and the second thin film line TL2 are electrically connected by means of the first conductive fiber tape 150.

As described above, the first conductive fiber tape 150 bonds and electrically connects the third flexible circuit film FF3 and the bottom surface of the support member 120 to each other. Further, referring to FIG. 2, the first conductive fiber tape 150 covers at least a part of the third flexible circuit film FF3 and the second printed circuit board PCB2 and is attached to be in contact with the bottom surface of the support member 120. The third flexible circuit film FF3 and the second printed circuit board PCB2 are attached to the support member 120 and fixed to each other by means of the first conductive fiber tape 150.

Further, the first conductive fiber tape 150 electrically connects the third flexible circuit film FF3, the second printed circuit board PCB2, and the support member 120. By doing this, the ground voltage of the support member 120 can be applied to the second flexible circuit film FF2 and the third flexible circuit film FF3. In FIG. 2, it is illustrated that the first conductive fiber tape 150 does not cover the second flexible circuit film FF2, but it is not limited thereto and the first conductive fiber tape 150 can be attached to cover a part of the second flexible circuit film FF2.

In the meantime, referring to FIG. 2, a second conductive fiber tape 155 which is attached to a part of the support member 120 to cover a part of the second printed circuit board PCB2 is disposed. The second conductive fiber tape 155 electrically connects the ground electrode formed in the second printed circuit board PCB2 and the support member 120 to reduce the resistance. Referring to FIG. 3C together, the second conductive fiber tape 155 can be attached to cover one side of the second printed circuit board PCB2 and one side surface of the support member 120. For example, the second conductive fiber tape 155 can be continuously disposed so as to cover one surface and a side surface of the second printed circuit board PCB2 and parts of the bottom surface and the side surface of the support member 120.

Figure 4:
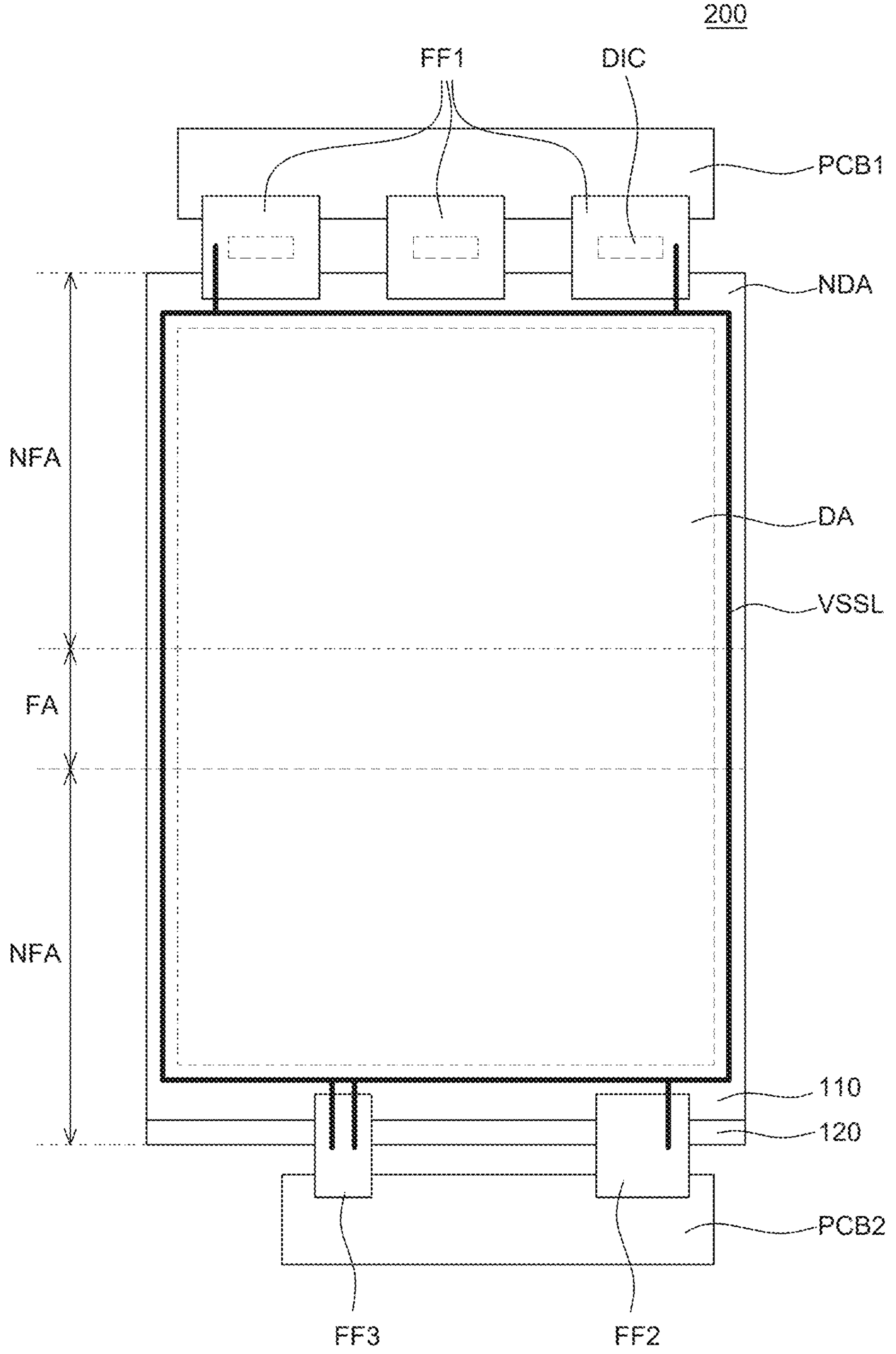
FIG. 4 is a plan view of an organic light emitting display device according to another exemplary embodiment of the present disclosure.
Figure 5:
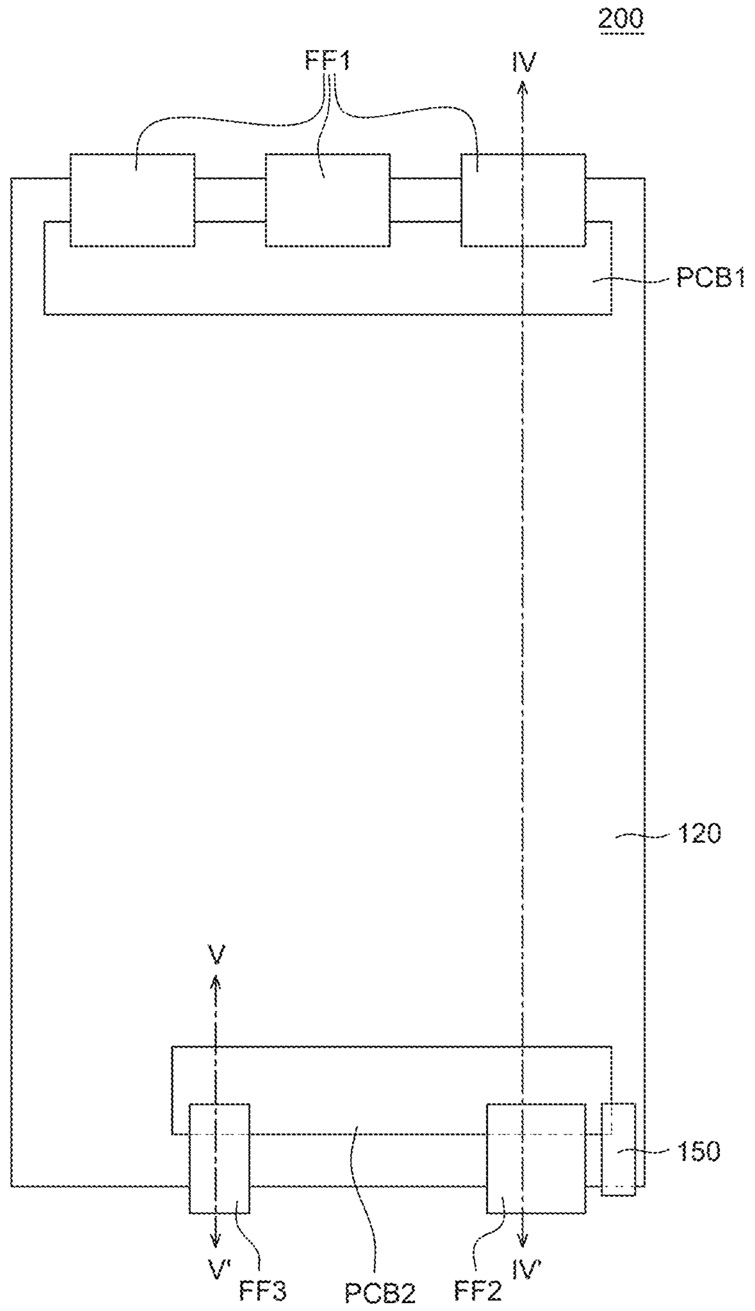
FIG. 5 is a rear view of an organic light emitting display device according to another exemplary embodiment of the present disclosure.
Figure 6A:
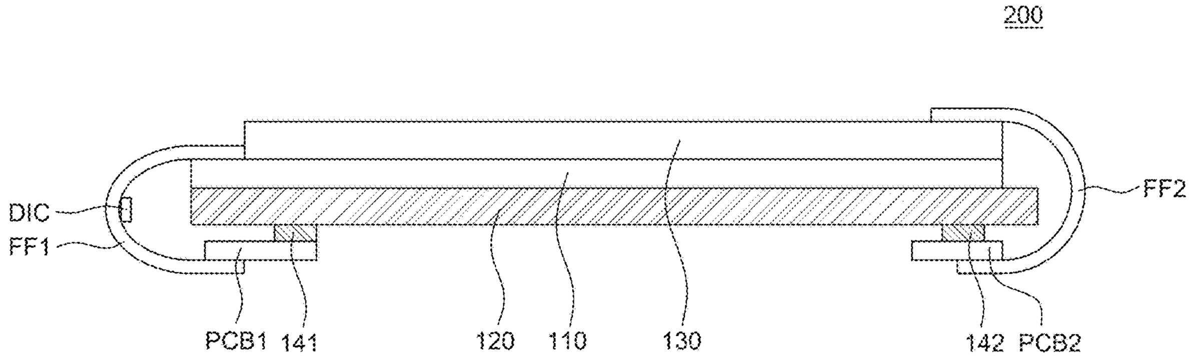
FIG. 6A is a cross-sectional view taken along the line IV-IV' of FIG. 5.
Figure 6B:
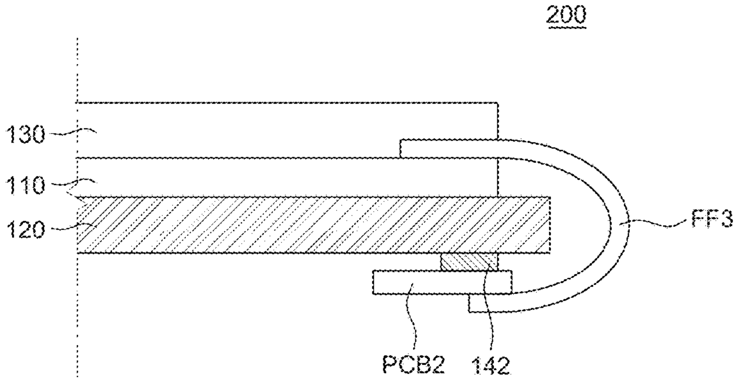
FIG. 6B is a cross-sectional view taken along the line V-V' of FIG. 5.

FIGS. 4 to 6B are views for explaining an organic light emitting display device according to another exemplary embodiment of the present disclosure. Particularly, FIG. 4 is a plan view of an organic light emitting display device according to another exemplary embodiment of the present disclosure. FIG. 5 is a rear view of an organic light emitting display device according to another exemplary embodiment of the present disclosure. FIG. 6A is a cross-sectional view taken along the line IV-IV' of FIG. 5. FIG. 6B is a cross-sectional view taken along the line V-V' of FIG. 5. An organic light emitting display device 200 illustrated in FIGS. 4 to 6B is substantially the same as the organic light emitting display device 100 illustrated in FIGS. 1 to 3B except for a connection structure of the second flexible circuit film FF2 and the third flexible circuit film FF3. Therefore, a description of repeated components will be omitted or may be briefly provided.

An organic light emitting display device 200 according to another exemplary embodiment of the present disclosure includes a display panel 110, a touch panel 130, a support member 120, a first flexible circuit film FF1, a second flexible circuit film FF2, a third flexible circuit film FF3, a first printed circuit board PCB1, and a second printed circuit board PCB2.

Referring to FIG. 4, the first flexible circuit film FF1 is disposed on one side of the display panel 110 and is attached to the first printed circuit board PCB1. Further, the second flexible circuit film FF2 is disposed on the other side of the touch panel 130 and the third flexible circuit film FF3 is disposed on the other side of the display panel 110. At this time, the second flexible circuit film FF2 and the third flexible circuit film FF3 are attached to the second flexible circuit board PCB2. The second printed circuit board PCB2 supplies various touch signals to a touch electrode formed on the touch panel 130 by means of the second flexible circuit film FF2.

Further, the second printed circuit board PCB2 is connected to the support member 120 by means of the ground line. Specifically, the second printed circuit board PCB2 is attached to the bottom surface of the support member 120 by means of the second conductive adhesive member 142. By doing this, the ground line of the second printed circuit board PCB2 and the support member 120 are electrically connected to each other by means of the second conductive adhesive member 142. The second printed circuit board PCB2 can apply the ground voltage of the support member 120 to the low potential voltage line VSSL by means of the third flexible circuit film FF3. By doing this, the third flexible circuit film FF3 can provide a ground line path between the second printed circuit board PCB2 and the display panel 110.

In the meantime, referring to FIG. 5, the first conductive fiber tape 150 covers at least a part of the second printed circuit board PCB2 and is attached to be in contact with the bottom surface of the support member 120. The second printed circuit board PCB2 is electrically connected to the support member 120 by means of the second conductive adhesive member 142 and is further connected to the support member 120 by means of the first conductive fiber tape 150 to compensate for the resistance. Therefore, the change in the ground voltage is minimized to apply the ground voltage to the low potential voltage line VSSL by means of the second printed circuit board PCB2 and the third flexible circuit film FF3.

Figure 7:
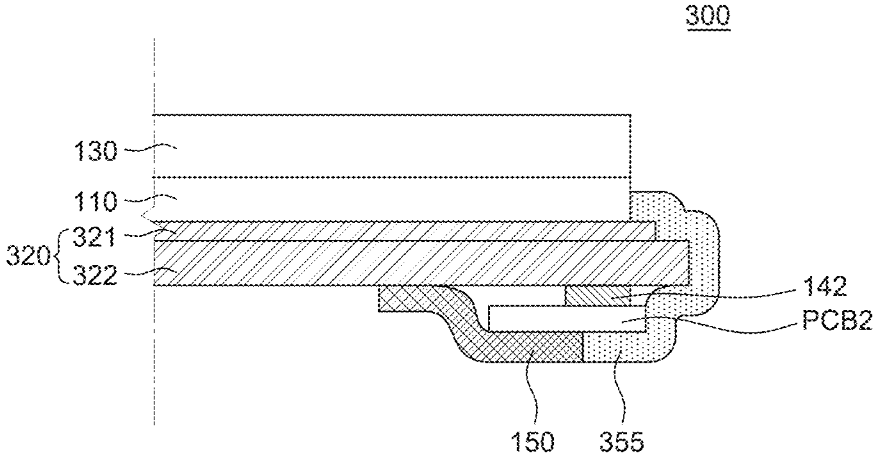
FIG. 7 is an enlarged cross-sectional view of an organic light emitting display device according to still another exemplary embodiment of the present disclosure.

FIG. 7 is an enlarged cross-sectional view of an organic light emitting display device according to still another exemplary embodiment of the present disclosure. An organic light emitting display device 300 illustrated in FIG. 7 is substantially the same as the organic light emitting display device 100 illustrated in FIGS. 1 to 3B except for a structure of a support member 320 configured by a plate top 321 and a plate bottom 322. Therefore, a description of repeated components will be omitted or may be briefly provided.

Referring to FIG. 7, a support member 320 includes a plate top 321 disposed below the display panel 110 and a plate bottom 322 disposed below the plate top 321. The plate top 321 and the plate bottom 322 are formed of a metal material such as stainless steel SUS or invar.

At this time, the first conductive fiber tape 150 attaches and electrically connects the second printed circuit board PCB2 onto the rear surface of the support member 320. Further, the second conductive fiber tape 355 also attaches and electrically connects the second printed circuit board PCB2 to the support member 320. Specifically, referring to FIG. 7, the second conductive fiber tape 355 is disposed on one surface of the second printed circuit board PCB2 so as to cover a part of the second printed circuit board PCB2 and then disposed in parts of a bottom surface and a side surface of the support member 320.

Like the organic light emitting display device 300 illustrated in FIG. 7, when the support member 320 includes the plate top 321 and the plate bottom 322, the second conductive fiber tape 355 is in contact with a bottom surface, a side surface, and a part of a top surface of the plate bottom 322 and a side surface and a part of the top surface of the plate top 321. The second conductive fiber tape 355 is disposed to be simultaneously in contact with the plate bottom 322 and the plate top 321 to increase a contact area with the support member 320 to reduce a contact resistance. Further, the plate top 321 is disposed to be close to the display panel 110, so that a noise radiated from the thin film transistor during the driving of the display panel 110 can be more easily reduced by the plate top 321 disposed therebelow.

Figure 8:
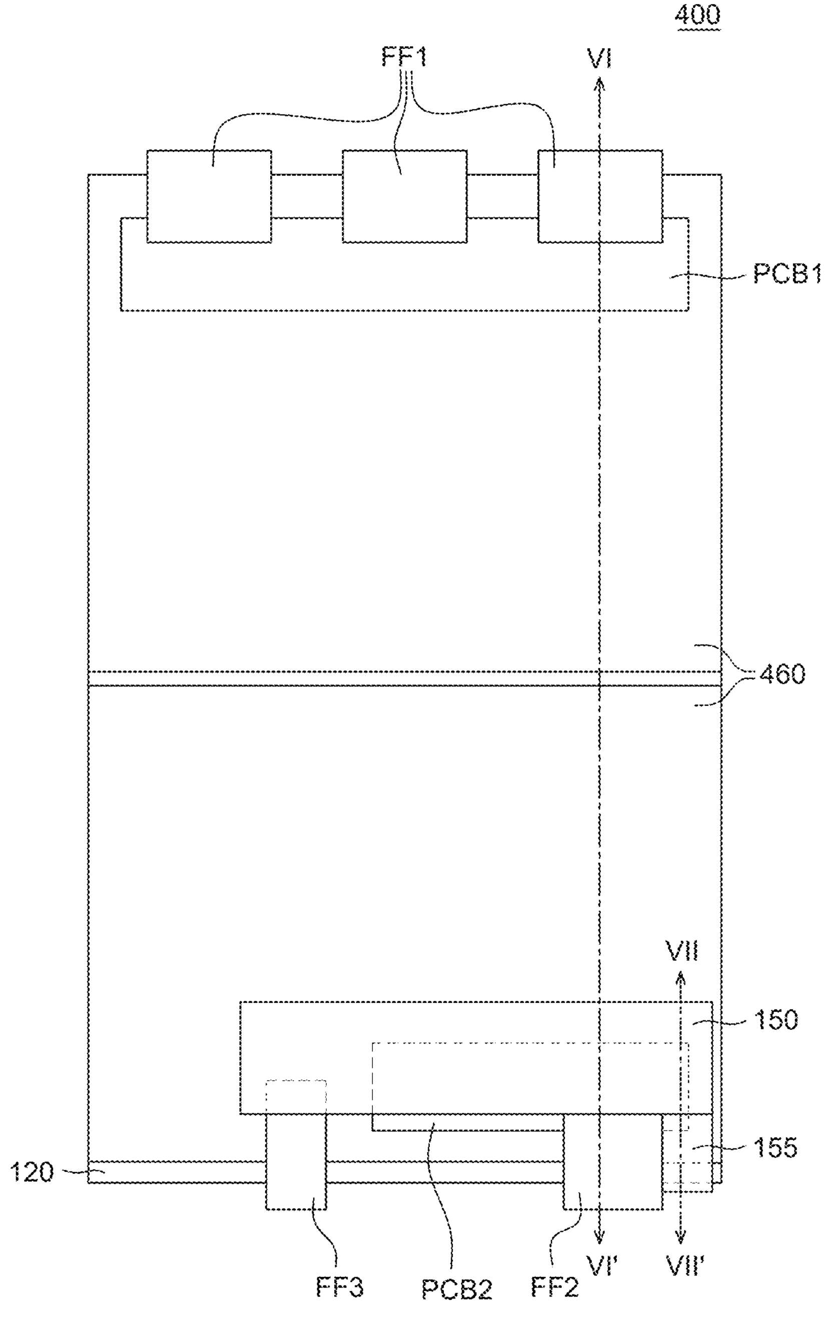
FIG. 8 is a rear view of an organic light emitting display device according to still another exemplary embodiment of the present disclosure.
Figure 9A:
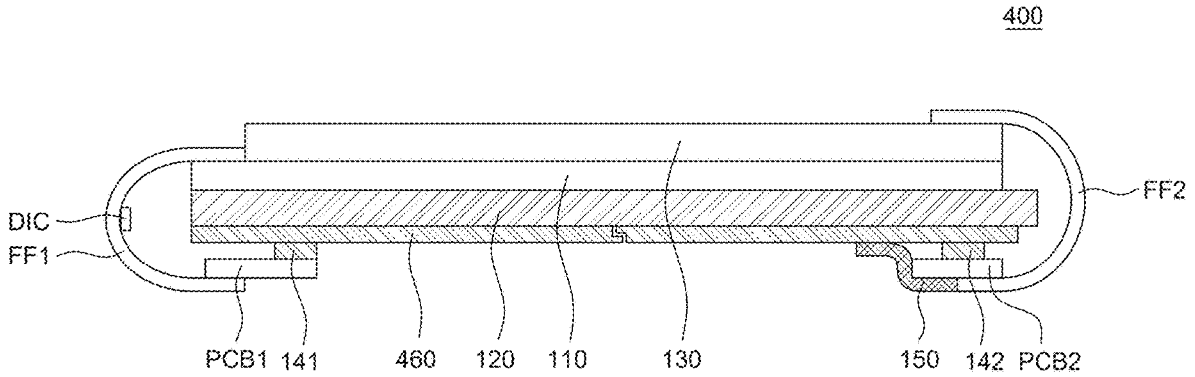
FIG. 9A is a cross-sectional view taken along the line VI-VI' of FIG. 8.
Figure 9B:
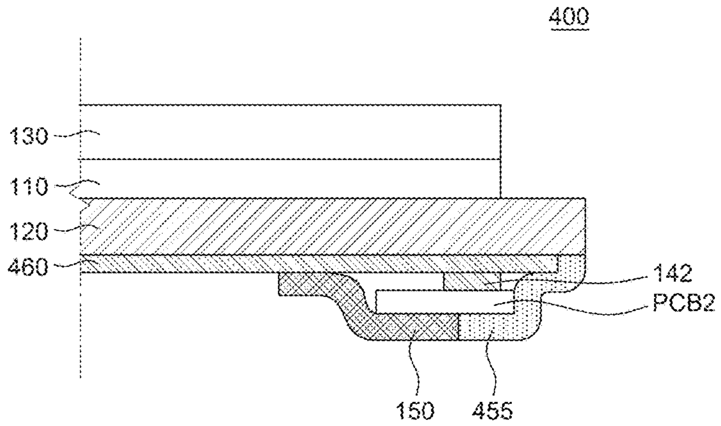
FIG. 9B is a cross-sectional view taken along the line VII-VII' of FIG. 8.

FIGS. 8 to 9B are views for explaining an organic light emitting display device according to still another exemplary embodiment of the present disclosure. Particularly, FIG. 8 is a rear view of an organic light emitting display device according to still another exemplary embodiment of the present disclosure. FIG. 9A is a cross-sectional view taken along the line VI-VI' of FIG. 8. FIG. 9B is a cross-sectional view taken along the line VII-VII' of FIG. 8. An organic light emitting display device 400 illustrated in FIGS. 8 to 9B is substantially the same as the organic light emitting display device 100 illustrated in FIGS. 1 to 3B except that a carbon plate 460 is further included. Therefore, a description of repeated components will be omitted or may be briefly provided.

Referring to FIGS. 8 to 9B, the organic light emitting display device 400 according to still another exemplary embodiment of the present disclosure further includes a carbon plate 460 disposed below the support member 120.

The carbon plate 460 can be formed by immersing or dispersing a plurality of carbon fibers in a resin, but is not limited thereto. The carbon fiber does not absorb moisture so that it has an excellent moisture proof ability. Further, the carbon fiber has an excellent mechanical property so that it can implement a large mechanical rigidity even with a small thickness. Accordingly, an overall rigidity of the organic light emitting display device 400 can be improved. Further, the carbon plate 460 has a conductivity. Therefore, in the organic light emitting display device 400 according to still another exemplary embodiment of the present disclosure, the carbon plate 460 can provide a ground together with the support member 120.

One pair of carbon plates 460 can be provided so that the organic light emitting display device 400 can be folded. The carbon plate 460 has a large mechanical rigidity so that it can be difficult to fold the carbon plate. Therefore, the carbon plates 460 are disposed so as to correspond to the non-folding areas and are disposed to be spaced apart from each other to correspond to the folding area. In the meantime, one pair of carbon plates 460 is connected by a hinge structure to implement the folding.

Referring to FIG. 9A, the second printed circuit board PCB2 connected to the second flexible circuit film FF2 is attached onto the bottom surface of the carbon plate 460 by means of a second conductive adhesive member 142. Accordingly, the second flexible circuit film FF2 can have a ground structure which is electrically connected to the ground of the carbon plate 460 by means of the second printed circuit board PCB2 and the second conductive adhesive member 142. Further, the second printed circuit board PCB2 is fixed and is electrically connected to the carbon plate 460 by the first conductive fiber tape 150. The first conductive fiber tape 150 attaches and electrically connects the second printed circuit board PCB2 onto the bottom surface of the carbon plate 460. The first conductive fiber tape 150 covers at least a part of the second printed circuit board PCB2 and is attached to be in contact with the bottom surface of the carbon plate 460.

Referring to FIG. 9B, a second conductive fiber tape 455 which is attached to a part of the carbon plate 460 to cover a part of the second printed circuit board PCB2 is disposed. The second conductive fiber tape 455 electrically connects the ground electrode formed in the second printed circuit board PCB2 and the carbon plate 460 to reduce the resistance. The second conductive fiber tape 455 is attached to cover one side of the second printed circuit board PCB2 and one side surface of the carbon plate 460. For example, the second conductive fiber tape 455 can be continuously disposed so as to cover one surface and a side surface of the second printed circuit board PCB2, one surface and a side surface of the carbon plate 460, and a part of the bottom surface of the support member 120.

The organic light emitting display device 400 according to still another exemplary embodiment of the present disclosure further includes the carbon plate 460 to improve a rigidity. When the carbon plate 460 is disposed below the support member 120 formed of a metal material, a ground structure which is electrically connected to the ground of the carbon plate 460 can be implemented using the printed circuit board and the flexible circuit film.

Hereinafter, the effects of the present disclosure will be described in more detail with reference to Exemplary Embodiments and Comparative Embodiments. However, the following Exemplary Embodiments are set forth to illustrate the present disclosure, but the scope of the disclosure is not limited thereto.

Exemplary Embodiment

Like the organic light emitting display device according to one exemplary embodiment of the present disclosure, when an organic light emitting display device having a structure in which the display panel and the support member were grounded by the first flexible circuit film, the touch panel and the support member were grounded by the second flexible circuit film, and the display panel and the support member were grounded by the third flexible circuit film which applies an additional low potential voltage was driven, a noise sensitivity generated in the touch panel was measured.

Comparative Embodiment

Unlike Exemplary Embodiment, when an organic light emitting display device in which the first flexible circuit film and the second flexible circuit film were not grounded with the support member and the third flexible circuit film was not provided was driven, a noise sensitivity generated in the touch panel was measured.

Figure 10A:
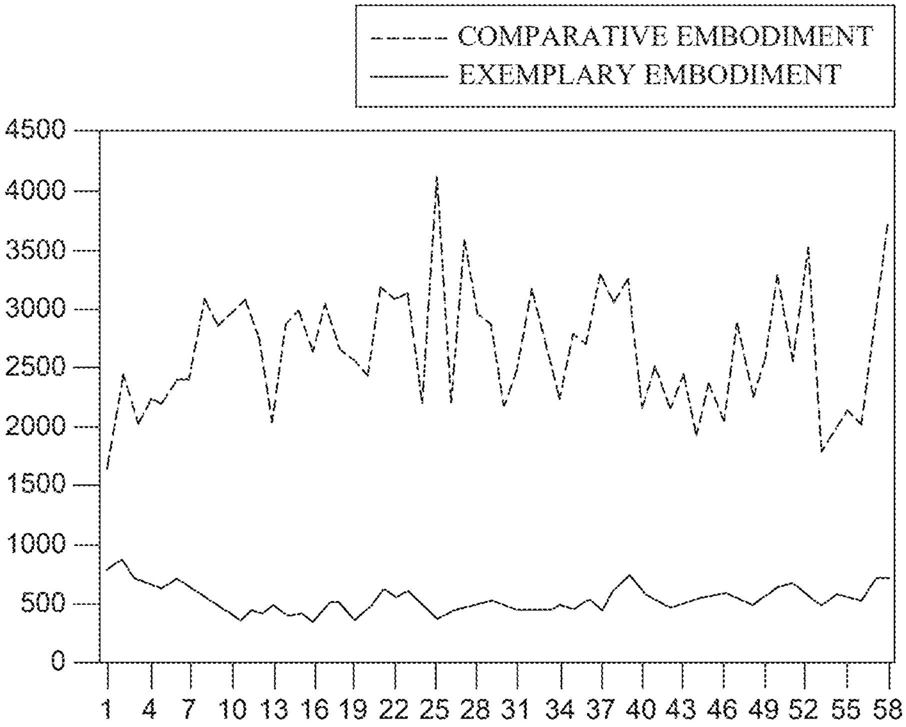
FIGS. 10A and 10B are examples of noise sensitivity measuring graphs of a touch panel in an organic light emitting display device according to Exemplary Embodiment and Comparative Embodiment.
Figure 10B:
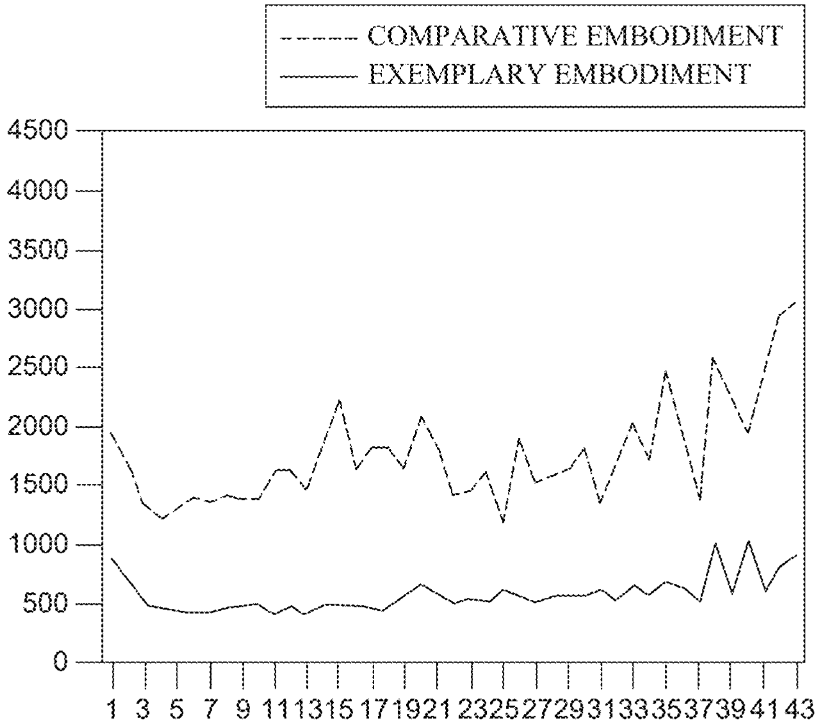

FIGS. 10A and 10B are noise sensitivity measuring graphs of a touch panel in an organic light emitting display device according to Exemplary Embodiment and Comparative Embodiment. FIG. 10A is a noise sensitivity of a touch panel measured by means of a sensing electrode and FIG. 10B is a noise sensitivity of a touch panel measured by means of a sensing electrode.

Referring to FIGS. 10A and 10B, it is confirmed that when the first flexible circuit film, the second flexible circuit film, and the third flexible circuit film are connected to the support substrate to implement a ground structure which is electrically connected to the ground of the support member, a noise generated in the touch panel when the display panel operates is significantly reduced.

The exemplary embodiments of the present disclosure can also be described as follows:

According to an aspect of the present disclosure, there is provided an organic light emitting display device. The organic light emitting display device comprise an organic light emitting display panel including a plurality of sub pixels, a touch panel on the organic light emitting display panel, a support member which is disposed below the organic light emitting display panel and is formed of a metal material, a first flexible circuit film which is disposed on one side of the organic light emitting display panel and is bent toward a bottom surface of the support member, a second flexible circuit film which is disposed on one side of the touch panel and is bent toward the bottom surface of the support member, and a third flexible circuit film which is disposed on one side of the organic light emitting display panel and is bent toward the bottom surface of the support member to stabilize a low potential voltage. The first flexible circuit film, the second flexible circuit film, and the third flexible circuit film are grounded to the support member.

The first flexible circuit film, the second flexible circuit film, and the third flexible circuit film can be electrically connected.

The organic light emitting display device can further comprise a low potential voltage line disposed on the organic light emitting display panel to supply a low potential voltage to the plurality of sub pixels. The low potential voltage line can be electrically connected to the first flexible circuit film and the third flexible circuit film.

The organic light emitting display device can further comprise a first printed circuit board which is connected to the first flexible circuit film and includes a driving circuit supplying the low potential voltage to the low potential voltage line, and a second printed circuit board which is connected to the second flexible circuit film and includes the driving circuit supplying a touch signal to the touch panel. The first printed circuit board and the second printed circuit board can be electrically connected to the support member.

The organic light emitting display device can further comprise a first conductive adhesive member bonding the first printed circuit board and the support member, and a second conductive adhesive member bonding the second printed circuit board and the support member.

The organic light emitting display device can further comprise a first conductive fiber tape attached to cover at least a part of the second printed circuit board and the third flexible circuit film so that the second printed circuit board and the third flexible circuit film are in contact with the bottom surface of the support member.

The first conductive fiber tape can be in contact with the second printed circuit board, the third flexible circuit film, and the support member to be electrically connected.

The third flexible circuit film can include a flexible base layer, a first thin film line disposed on one surface of the flexible base layer to face the bottom surface of the support member during the bending, a second thin film line disposed on the other surface of the flexible base layer, and an insulating layer covering at least a part of the second thin film line. The first thin film line can be in direct contact with the support member, and the first conductive fiber tape can be attached to the second thin film line and the bottom surface of the support member.

The organic light emitting display device can further comprise a second conductive fiber tape attached to the second printed circuit board and the support member to electrically connect the support member and a ground electrode formed on the second printed circuit board.

The second conductive fiber tape can be continuously disposed to cover a part of a bottom surface and a side surface of the second printed circuit board and a part of the bottom surface and a side surface of the support member.

The support member can include a plate top disposed below the organic light emitting display panel and a plate bottom disposed below the plate top, and the second conductive fiber tape can be in contact with a part of a bottom surface, a side surface, and a top surface of the plate bottom and be in contact with a part of a side surface and a top surface of the plate top.

The organic light emitting display device can further comprise a carbon plate disposed below the support member, and a first conductive fiber tape attached to cover at least a part of the second printed circuit board and the third flexible circuit film so that the second printed circuit board and the third flexible circuit film are in contact with a bottom surface of the carbon plate.

The organic light emitting display device can further comprise a second conductive fiber tape continuously disposed to cover a part of the second printed circuit board, a part of the carbon plate, and a part of the support member to electrically connect the second printed circuit board to the support member and the carbon plate.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure.

The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A foldable display device which includes a folding area and a non-folding area adjacent to the folding area, the foldable display device comprising:

an organic light emitting display panel including a plurality of sub pixels and folded along a radius of curvature with respect to a folding axis;

a touch panel disposed on the organic light emitting display panel;

a support member disposed below the organic light emitting display panel;

a first flexible circuit film disposed on one side of the organic light emitting display panel, and configured to be bent toward a bottom surface of the support member;

a second flexible circuit film disposed on one side of the touch panel, and configured to be bent toward the bottom surface of the support member;

a low potential voltage line disposed on the organic light emitting display panel to supply a low potential voltage to the plurality of sub pixels;

a first printed circuit board connected to the first flexible circuit film, and including a driving circuit configured to supply the low potential voltage to the low potential voltage line; and a second printed circuit board connected to the second flexible circuit film which is supplied with a touch signal to the touch panel, wherein the first flexible circuit film and the second flexible circuit film are grounded to the support member which is having a ground voltage, wherein the second printed circuit board is electrically connected to the support member to the low potential voltage line, wherein the ground voltage is applied to the low potential voltage line through the second printed circuit board, wherein the second flexible circuit film is disposed on a first side of the organic light emitting display panel, the first flexible circuit film is disposed on a second side of the organic light emitting display panel opposite to the first side, wherein the first side and the second side of the organic light emitting display panel extend in a direction that is to the folding axis.

2. The foldable display device according to claim 1, further comprising:

a third flexible circuit film disposed on one side of the organic light emitting display panel, and configured to be bent toward the bottom surface of the support member.

3. The foldable display device according to claim 2, wherein the third flexible circuit film is disposed on the first side of the organic light emitting display panel.

4. The foldable display device according to claim 2, wherein the first flexible circuit film and the third flexible circuit film are electrically connected to the low potential voltage line.

5. The foldable display device according to claim 4, wherein the low potential voltage is applied to the low potential voltage line via the first and third flexible circuit films.

6. The foldable display device according to claim 2, wherein the first flexible circuit film and the third flexible circuit film are grounded to the support member.

7. The foldable display device according to claim 1, wherein the low potential voltage line is disposed on the organic light emitting display panel in a closed loop surrounding the plurality of sub pixels.

8. The foldable display device according to claim 5, wherein the first flexible circuit film and the third flexible circuit film supply the low potential voltage to opposite sides of a closed loop of the low potential voltage line.

9. The foldable display device according to claim 1, wherein the first printed circuit board and the second printed circuit board are electrically connected to the support member.

10. The foldable display device according to claim 1, further comprising:

a first conductive adhesive member bonding the first printed circuit board and the support member; and a second conductive adhesive member bonding the second printed circuit board and the support member.

11. The foldable display device according to claim 2, wherein the second flexible circuit film and the third flexible circuit film are attached to the second printed circuit board.

12. The foldable display device according to claim 11, further comprising:

a first conductive fiber tape covering at least a part of the second printed circuit board, and attached to be in contact with the support member to be electrically connected.

13. The foldable display device according to claim 1, wherein the support member includes a plate top disposed below the organic light emitting display panel and a plate bottom disposed below the plate top.

14. The foldable display device according to claim 2, further comprising:

a carbon plate disposed below the support member; and a first conductive fiber tape attached to cover at least a part of the second printed circuit board and the third flexible circuit film, so that the second printed circuit board and the third flexible circuit film are in contact with a bottom surface of the carbon plate.

15. The foldable display device according to claim 14, further comprising:

a second conductive fiber tape continuously disposed to cover a part of the second printed circuit board, a part of the carbon plate, and a part of the support member to electrically connect the second printed circuit board to the support member and the carbon plate.

16. The foldable display device according to claim 2, wherein an end portion of the first flexible circuit film is disposed on an upper surface of the organic light emitting display panel, wherein an end portion of the second flexible circuit film is disposed on an upper surface of the touch panel, and wherein an end portion of the third flexible circuit film is disposed on the upper surface of the organic light emitting display panel.

17. The foldable display device according to claim 2, wherein the third flexible circuit film is connected to the second flexible circuit film via a second printed circuit board, and wherein the second printed circuit board is configured to supply a touch signal to the touch panel.

18. The foldable display device according to claim 2, further comprising:

a first conductive fiber tape attached to cover at least a part of the second printed circuit board and the third flexible circuit film so that the second printed circuit board and the third flexible circuit film are in contact with the bottom surface of the support member, wherein an upper surface of one side of the first conductive fiber tape contacts with the bottom surface of the second printed circuit board and the third flexible circuit film and an upper surface of the other side of the first conductive fiber tape contacts with the bottom surface of the support member.

19. The foldable display device according to claim 2, wherein the third flexible circuit film includes:

a flexible base layer, a first thin film line disposed on one surface of the flexible base layer to face the bottom surface of the support member during bending, a second thin film line disposed on another surface of the flexible base layer, and an insulating layer covering at least a part of the second thin film line, and wherein the first thin film line is in direct contact with the support member.

20. The foldable display device according to claim 1, further comprising:

the organic light emitting display panel including a flexible substrate, a thin film transistor, and an organic light emitting diode; and the flexible substrate including a first plastic film, an inorganic layer, and a second plastic film.

* * * * *